United States Patent [19]

Human

[11] 4,222,604
[45] Sep. 16, 1980

[54] CARAVAN OR CAMPERVAN CONSTRUCTION

[76] Inventor: Douglas Human, 119 Pakington St., Kew, Victoria, Australia

[21] Appl. No.: 934,502

[22] Filed: Aug. 17, 1978

[30] Foreign Application Priority Data

Aug. 17, 1977 [AU] Australia .............................. 1272/77

[51] Int. Cl.² .............................................. B60P 3/34
[52] U.S. Cl. .................................. 296/165; 296/172; 296/176
[58] Field of Search ............... 296/159, 160, 161, 163, 296/165, 169, 172, 176, 164, 26; 52/69; 160/66, 67, 68

[56] References Cited

U.S. PATENT DOCUMENTS

| | | | |
|---|---|---|---|
| 3,195,190 | 7/1965 | Malo | 52/69 |
| 3,511,529 | 5/1970 | Cutsinger | 296/164 |
| 3,515,426 | 6/1970 | Gerber | 296/165 |
| 3,622,193 | 11/1971 | Schmidt | 296/164 |
| 3,811,723 | 5/1974 | Anderson | 296/172 |

FOREIGN PATENT DOCUMENTS

| | | |
|---|---|---|
| 119576 | 3/1945 | Australia . |
| 145476 | 5/1949 | Australia . |
| 260809 | 12/1964 | Australia . |
| 290795 | 3/1967 | Australia . |
| 424588 | 5/1969 | Australia . |

Primary Examiner—Robert R. Song
Attorney, Agent, or Firm—Armstrong, Nikaido, Marmelstein & Kubovcik

[57] ABSTRACT

A transportable housing structure comprising a cabin unit having access openings and a foldable/unfoldable annex attachment at the rear or trailing end and capable of forming a caravan-body or campervan-body or similar vehicular body is provided, the annex attachment being formed by a pair of rigid panel members hinged to the top and bottom of the cabin unit respectively for movement from a folded, relatively vertical, non-use position to an unfolded, relatively horizontal, in-use position; a flexible cover member extending around the peripheries of the panel members top to bottom from the rear of the cabin unit; a pair of hinged posts at the outer corners of the panel members to depend from the top panel member and support the unfolded top panel member on the unfolded bottom panel member; and a pair of hinged legs to depend from the outer corners of the bottom panel member and support the unfolded annex attachment on the ground.

12 Claims, 9 Drawing Figures

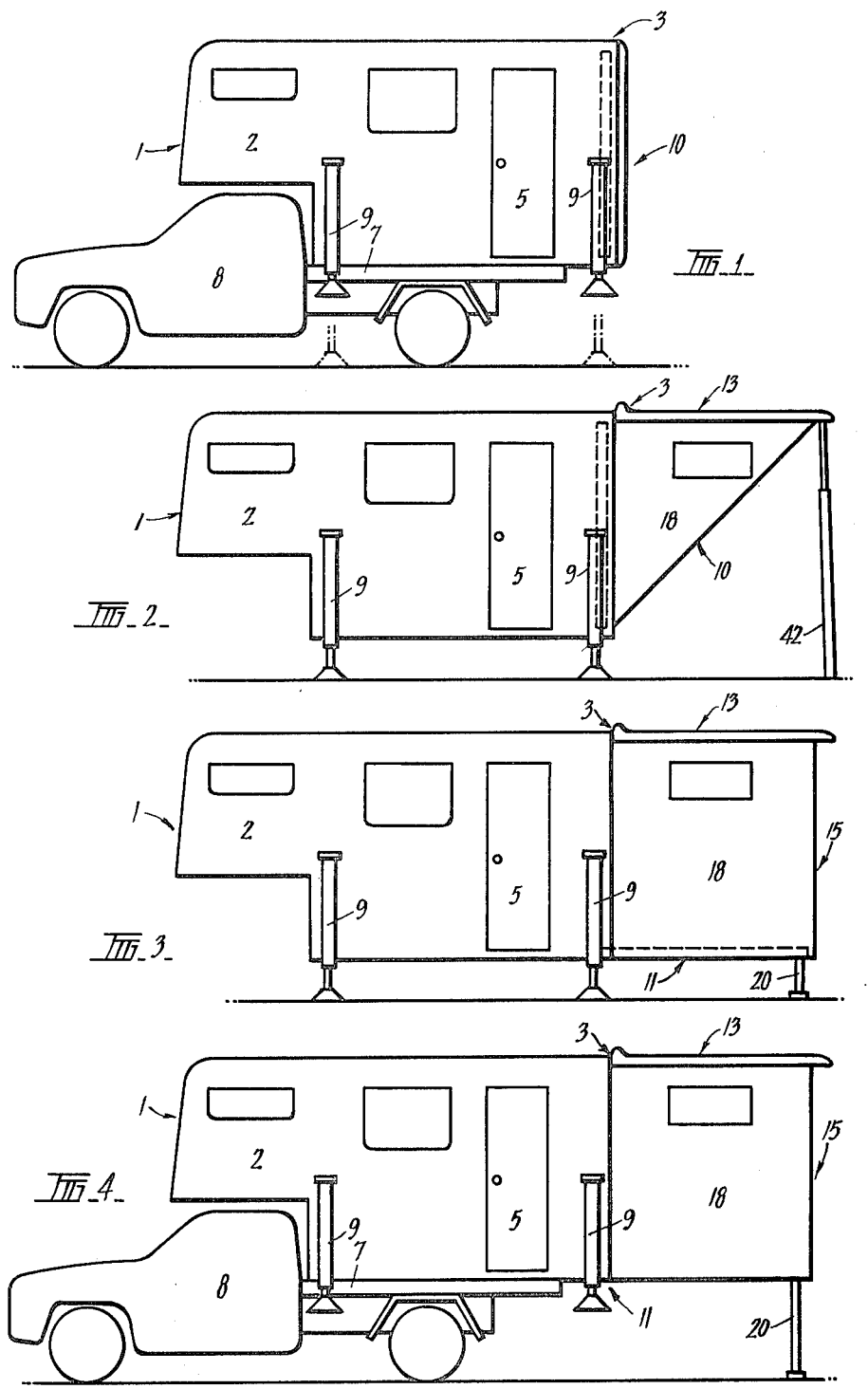

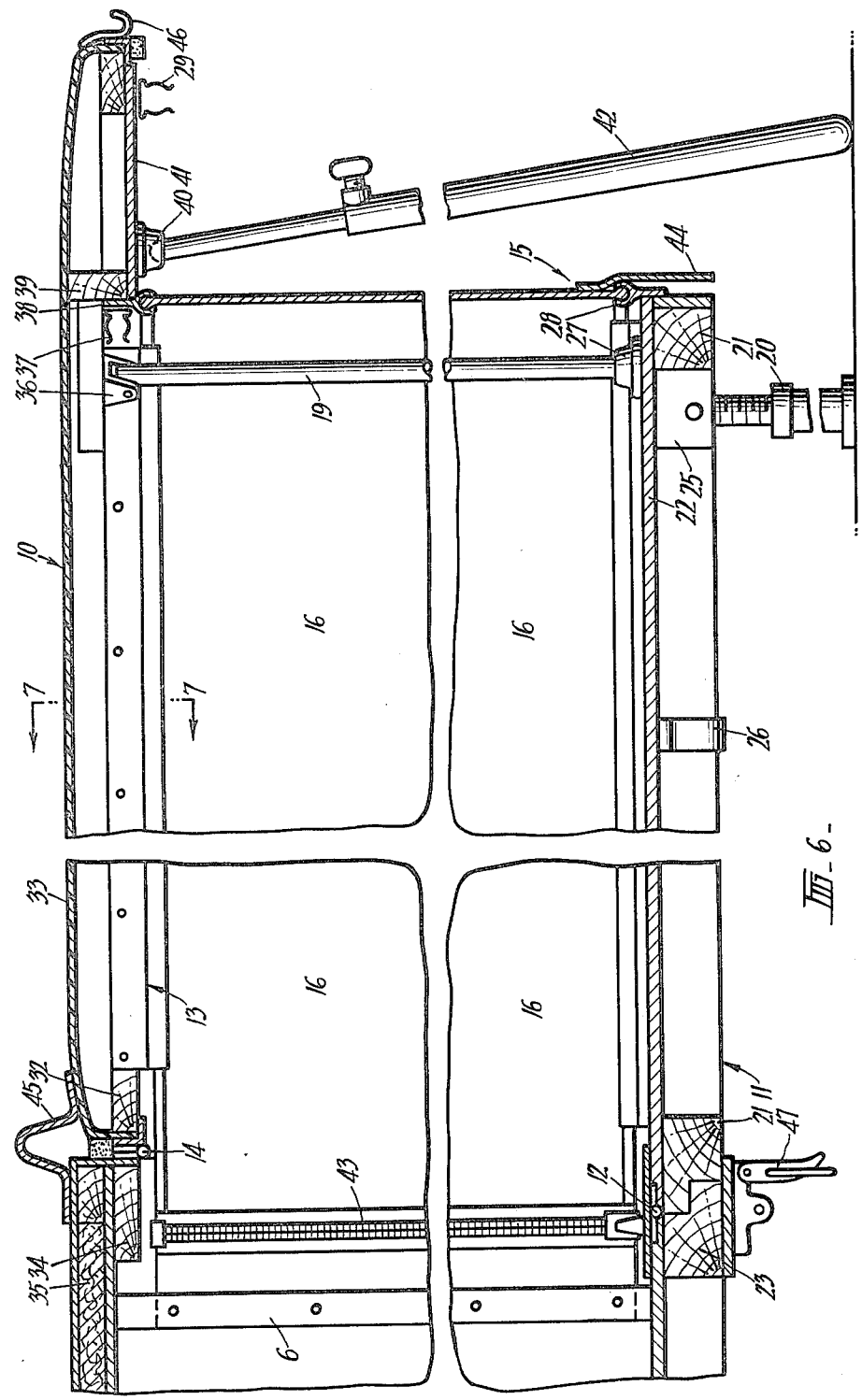

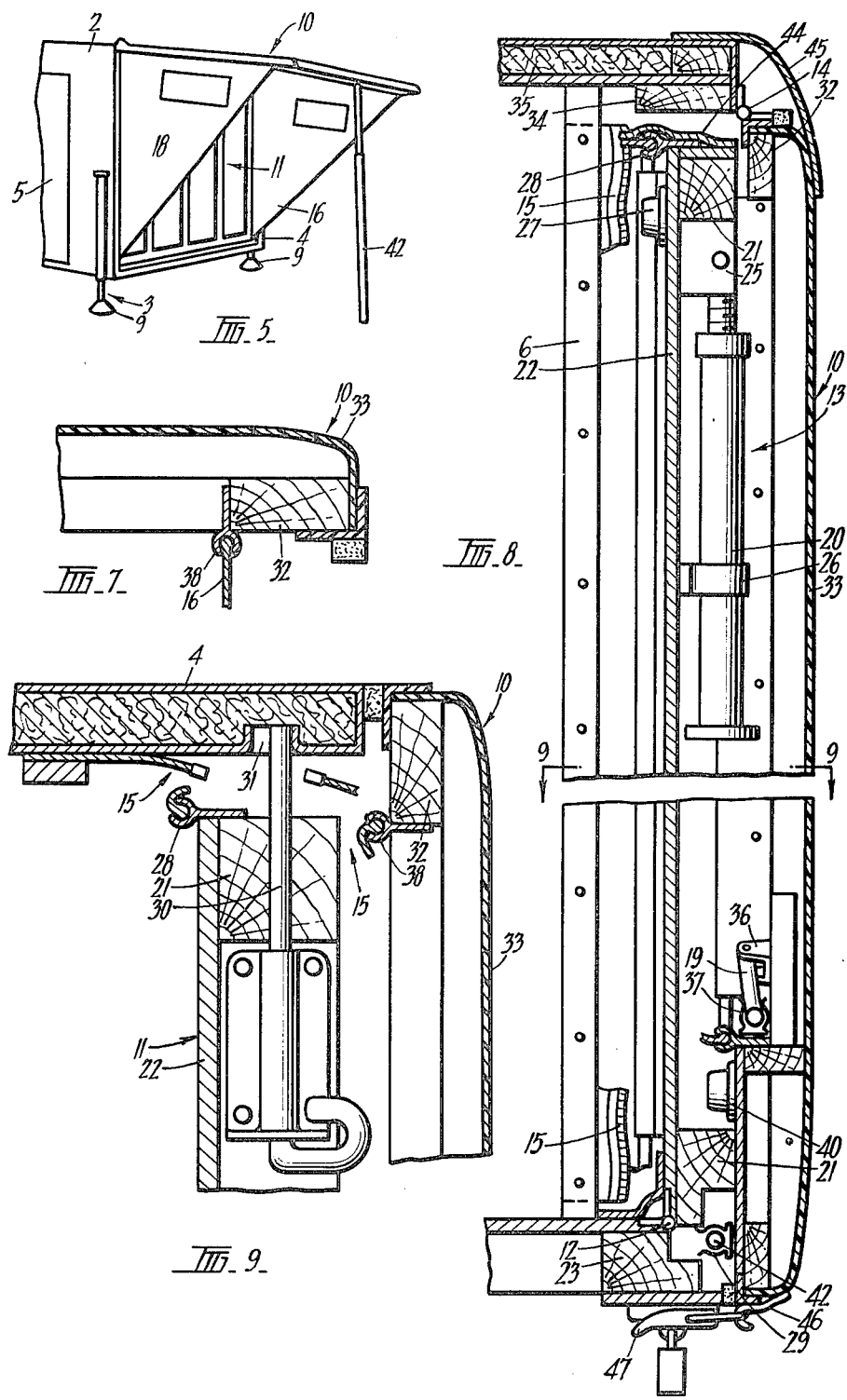

CARAVAN OR CAMPERVAN CONSTRUCTION

BACKGROUND OF THE INVENTION

This invention relates to a transportable housing structure capable of forming a caravan-body or campervan-body or similar vehicular-body, said structure comprising a cabin unit with a foldable/unfoldable annexe attachment at the rear or trailing end so as to provide extra housing space in the form of an enclosed room when the annexe attachment is unfolded/assembled.

The popularity of caravans and campervans as convenient transport/accommodation means is well recognized, so much so that the manufacture of them is widespread. Caravan or campervan bodies are generally rigid cabin unit structures, so designed as to have a maximum number of different facilities in the limited amount of space encompassed by the cabin unit.

Space available for living and/or sleeping quarters in caravan or campervan constructions generally is minimal in order to provide adequate space for cooking, eating and toilet facilities. The provision of means in the form of a conveniently collapsed/foldable annexe attachment at the rear of the caravan or campervan construction, which is readily unfoldable/assembled so as to enlarge the space available for living and/or sleeping quarters, is desirable.

SUMMARY OF THE INVENTION

In accordance with the present invention there is provided a transportable housing structure capable of forming a caravan-body or campervan-body or similar vehicular-body, said structure comprising a cabin unit having a main doorway in the near side wall and an access opening at the rear or trailing end, with an annexe attachment fitted to the rear or trailing end of said cabin unit so as to enclose the access opening, said annexe attachment comprising the assembly of a floor-forming rigid panel member hingedly connected to the rear or trailing end of said cabin unit at or near the bottom thereof so as to be hingedly lowered from a collapsed or folded, relatively vertical, non-use position to an assembled or unfolded, relatively horizontal, in-use position, and hingedly raised from an assembled or unfolded, relatively horizontal, in-use position to a collapsed or folded, relatively vertical, non-use position; a roof or ceiling-forming rigid panel member hingedly connected to the rear or trailing end of said cabin unit at or near the top thereof so as to be hingedly raised from a collapsed or folded, relatively vertical, non-use position to an assembled or unfolded, relatively horizontal, in-use position, and hingedly lowered from an assembled or unfolded, relatively horizontal, in-use position to a collapsed or folded, relatively vertical, non-use position; a flexible cover member fitted to extend from the rear or trailing end of said cabin unit at the off-side of said cabin unit, top to bottom, around the periphery of said roof or ceiling-forming rigid panel member and the periphery of said floor-forming rigid panel member to the near-side of said cabin unit, top to bottom, so as to form an off-side wall and end wall and near side wall when said panel members are in the assembled or unfolded, relatively horizontal, in-use position; a roof or ceiling-supporting corner post fitted so as to extend between said roof or ceiling-forming and floor-forming rigid panel members at both the outer corners of said panel members, when said panel members are in the assembled or forming panel member; and floor-supporting legs hingedly connected to the floor-forming rigid panel member so as to be hingedly movable from a collapsed or folded, non-use position to an assembled or unfolded, in-use position for engagement with the ground at or near the rear or trailing extremity when said rigid panel member is in the assembled or unfolded, relatively horizontal, in-use position.

DESCRIPTION OF THE PREFERRED EMBODIMENT OF THE INVENTION

According to a preferred embodiment of the invention, the disposition of the hinged roof or ceiling-forming rigid panel member in relation to the hinged floor-forming rigid panel member, with respect to order of collapsing or folding and assembling or unfolding, is such that the hinged roof or ceiling-forming rigid panel member is outermost at the rear or trailing end of the cabin unit when said panel members are in the collapsed or folded, relatively vertical, non-use position. In this position, the hinged roof or ceiling-forming rigid panel member covers the hinged floor-forming rigid panel member, said hinged roof or ceiling-forming rigid panel member conveniently being releasably fastened in that position by fastening means such as a hook fitted to the rear or trailing end of said panel member for engagement with a latch at the bottom of said cabin unit.

In collapsing the annexe attachment of the invention into the folded, relatively vertical, non-use position, the floor-forming rigid panel member is hingedly raised from the unfolded, relatively horizontal, in-use position to the folded, relatively vertical, non-use position against the rear or trailing end of the cabin unit forming the caravan/campervan/vehicular body, where it can be releasably fastened to said cabin unit at the near and/or off side of said cabin unit by bolt means or other suitable fastening device. Thereupon, the roof or ceiling-forming rigid panel member is hingedly lowered from the unfolded, relatively horizontal, in-use position to the folded, relatively vertical, non-use position against the collapsed or folded floor-forming rigid panel member, where it can be releasably fastened in that position to said cabin unit by hook and latch means as later indicated.

The flexible cover member forming the off-side wall and end wall and near-side wall of the annexe attachment of the invention, which can be of canvas or nylon fabric or any other natural or synthetic fabric material having adequate strength and weather-resistance for the purpose, can be either fixedly or removably connected to the rear or trailing end of said cabin unit and to the periphery of said roof or ceiling-forming rigid panel member and to the periphery of said floor-forming rigid panel member.

According to a preferred embodiment of the invention, the flexible cover member is removably connected as indicated, conveniently by slide-fastener connections attaching the opposite ends of the flexible cover member to the rear or trailing end of said cabin unit, conveniently with the top and bottom extremities of the flexible cover member slidably engaging with cover-retaining strip members fixed to the under face of said roof or ceiling-forming rigid panel member around its periphery and to the outer face of said floor-forming rigid panel member around its periphery.

More preferably, the flexible cover member is in three sections forming said off-side wall and end wall and near-side wall, and having slide-fastener connections for joining the three sections at spaced-apart locations at or near the roof or ceiling-supporting corner posts, the slide-fastener connections attaching the opposite ends of the cover member conveniently to flexible cover strips press-studded to the rear or trailing end of said cabin unit. In this way, each section of the flexible cover member can be independently opened and/or removed to suit the user, by operating the slide-fasteners and slidably disconnecting the top and bottom extremities of the flexible cover member from said cover-retaining strip members.

Fitting of the corner posts so as to extend between said roof or ceiling-forming and floor-forming rigid panel members at both of the outer corners of said panel members can be effected by hingedly attaching said corner posts to said roof or ceiling-forming rigid panel member near the outer corners of said panel member and inside the line of the flexible cover member so as to depend hingedly from said panel member and be received in sockets fixed to the inner face of said floor-forming panel member near the outer corners of said panel member. In this way, said corner posts are effectively retained in position so as to maintain the rear or trailing end of the roof or ceiling-forming rigid panel member supported on the rear or trailing end of the floor-forming rigid panel member when in the assembled or unfolded, relatively horizontal, in-use position.

Said corner posts also function to space the flexible cover member in forming the off-side wall and end wall and near-side wall at the rear or trailing end of the annexe attachment, by the flexible cover member being disposed on the outside of the corner posts. Thus, the corner posts are located inside the line of the flexible cover member when the components of the annexe attachment according to the invention are assembled into the unfolded or in-use form.

One or more of the near-side wall and the end wall and the off-side wall of the annexe attachment according to the invention may be provided with a flexible type of window arrangement. For instance, a fly-screen or clear plastic sheet or other such type of flexible window structure may be incorporated into the flexible cover member or into the separate sections of flexible cover member. Each said window arrangement may be provided with a roll-up blind.

In a preferred form of the invention, the cabin unit is fitted with mechanically-operated or hydraulically-operated retractible jacks for engagement/disengagement with the ground, so as to raise the cabin unit to an elevated position for dismounting from a vehicle tray or chassis on which the cabin unit has been mounted for transport to a location site, and lower the cabin unit to a lowered position for support at the location site, then raise the cabin unit from the lowered position to the elevated position for remounting on the vehicle tray or chassis for transport of said housing structure to another location site. Preferably a pair of said jacks is fitted to the near side and to the off-side of the cabin unit, in suitably spaced-apart relationship.

The invention will now be described with reference to the practical embodiment illustrated in the accompanying drawings, in which:

FIG. 1 is a diagrammatic side elevational view of a transportable housing structure according to the invention, in comprising a cabin unit with said annexe attachment in the collapsed or folded, non-use position, fitted to the rear or trailing end of the cabin unit, said cabin unit being removably mounted on a vehicle tray or chassis and fitted at the near-side and the off-side with a pair of mechanically-operated or hydraulically-operated retractible jacks for supporting the housing structure on the ground, when dismounted from the vehicle tray or chassis;

FIG. 2 is a diagrammatic side elevational view of the housing structure shown in FIG. 1 but showing the housing structure dismounted from the vehicle tray or chassis and supported on the ground by said pairs of jacks, and said annexe attachment partly assembled or unfolded to the extent that: said roof or ceiling-forming rigid panel member has been hingedly moved from the collapsed or folded, relatively vertical, non-use position to the assembled or unfolded, relatively horizontal, in-use position, with said cover member partly assembled or unfolded to reveal part of the near-side wall and off-side wall, and said roof or ceiling-forming rigid panel member temporarily supported in the in-use position by a prop-pole inserted between the ground and the rear or trailing of said roof or ceiling-forming rigid panel member;

FIG. 3 is a diagrammatic side elevational view of the housing structure shown in FIG. 2 but showing said annexe attachment fully assembled or unfolded to the extent that: said floor-forming rigid panel member has also been hingedly moved from the collapsed or folded, relatively vertical, non-use position to the assembled or unfolded, relatively horizontal, in-use position, with the floor-supporting legs hingedly moved from the collapsed or folded, non-use position to the assembled or unfolded, in-use position for engagement with the ground at or near the rear or trailing extremity of the annexe attachment when in the assembled or unfolded, in-use position, the roof or ceiling-supporting corner posts fitted in the in-use position at both of the outer corners of said panel members, and with the prop-pole removed from its temporary supporting position as indicated;

FIG. 4 is a diagrammatic side elevational view of the housing structure shown in FIG. 3 but showing said housing structure remounted on the vehicle tray or chassis, with said pairs of jacks retracted to a non-use position but said floor-supporting legs still engaging with the ground, pending collapsing and folding of the annexe attachment into the non-use position;

FIG. 5 is a fragmentary perspective view of said annexe attachment as seen from the rear or trailing end of the cabin unit and showing the annexe attachment partly assembled or unfolded as illustrated in FIG. 2;

FIG. 6 is a vertical cross-sectional view of said annexe attachment in the assembled or unfolded, in-use position, similar to what is illustrated in diagrammatic side elevational view in FIG. 3, but pending removal of the prop-pole in position between the ground and the rear or trailing end of said roof or ceiling-forming rigid panel member as illustrated in FIG. 2;

FIG. 7 is a vertical detail cross-sectional view taken at lines 7—7 of FIG. 6;

FIG. 8 is a vertical part cross-sectional view of said annexe attachment in the collapsed or folded, non-use position, similar to what is illustrated in diagrammatic side elevational view in FIG. 1; and FIG. 9 is a horizontal detail part cross-sectional view taken at lines 9—9 of FIG. 8.

Referring to the drawings, there is shown a cabin unit 1 having a near-side wall 2, a rear or trailing end 3, and an off-side wall 4, with a main doorway 5 in said near-side wall 2 and an access opening 6 in said rear or trailing end 3. Said cabin unit 1 is adapted to be removably mounted on the tray or chassis 7 of a vehicle 8, and has pairs of mechanically-operated or hydraulically-operated retractable jacks 9 fitted to said near-side wall 2 and off-side wall 4 for engagement with the ground when dismounted from the vehicle tray or chassis 7, and also has the annexe attachment 10 enclosing said access opening 6 at said rear or trailing end 3.

Said annexe attachment 10 comprises a floor-forming rigid panel member 11 connected by hinges 12 to the rear or trailing end 3 of the cabin unit 1 at or near the bottom thereof as indicated; a roof or ceiling-forming rigid panel member 13 connected by hinges 14 to the rear or trailing end 3 of the cabin unit 1 at or near the top thereof as indicated; a flexible cover member 15 fitted to extend from the rear or trailing end of the cabin unit 1 at the off-side wall 4, top to bottom, around the periphery of the roof or ceiling-forming rigid panel member 13, and around the periphery of the floor-forming panel member 11 to the near-side wall 2 of the cabin unit 1, top to bottom, so as to form an off-side wall 16 and an end wall 17 and a near-side wall 18; a pair of roof or ceiling-supporting corner posts 19, each one of which is fitted so as to extend between said floor-forming rigid panel member 11 and said roof or ceiling-forming rigid panel member 13 at an outer corner of said panel members 11 and 13; and a pair of floor-supporting legs 20, each one of which is hingedly connected to the floor-forming rigid panel member 11 as indicated.

The floor-forming rigid panel member 11 consists of a rectangular frame 21 forming the periphery of said panel member 11 and carrying flooring 22, the frame 21 being connected by said hinges 12 to beam 23 fixed to the bottom of the cabin unit 1. The pair of floor-supporting legs 20 are connected to the under face of the rectangular frame 21 by pivot member 25 and held in the non-use position by clips 26 outstanding from flooring 22. Socket members 27 are fixed to the flooring 22 near the rear or trailing peripheral edge of flooring 22 to receive the lower ends of the pair of roof or ceiling-supporting corner posts 19.

Cover-retaining strip members 28 are fixed to the outer face of said frame member 21 so as to slidably engage with and retain the bottom extremity of flexible cover member 15 as indicated. A bolt 30 fixed to the rectangular frame 21 and the end of which is adapted to be received in recess 31 in the off-side wall 4, enables the floor-forming rigid panel member 11 to be fastened in the collapsed or folded, relatively vertical, non-use position.

The roof or ceiling-forming rigid panel member 13 consists of a rectangular frame 32 forming the periphery of said panel member 13 and carrying the roofing or ceiling 33, the frame 32 being connected by said hinges 14 to beam 34 fixed to the top 35 of the cabin unit 1. The pair of roof or ceiling-supporting corner posts 19 are connected to the roof or ceiling-forming rigid panel member 13 by hinges 36 to hingedly depend therefrom and be received in said socket members 27 for suporting said roof or ceiling-forming rigid panel member 13 on said floor-forming rigid panel member 11, when in the assembled or unfolded, relatively horizontal, in-use position as shown in FIG. 6, or be hingedly moved into engagement with clips 37 for retaining said corner posts 19 when said floor-forming rigid panel member 11 is in the collapsed or folded, relatively vertical, non-use position as shown in FIG. 8.

Cover-retaining strip members 38 are fixed to frame 32, including the transverse beam 39 in forming part of frame 32 at the under face of said roof or ceiling-forming rigid panel member 13, so as to slidably engage with and retain the top extremity of flexible cover member 15 as indicated. Socket member 40 fixed to the eaves plate 41 covering the space between transverse beam 39 and frame 32 at the rear or trailing end of the roof or ceiling-forming rigid panel member 13, receives prop-pole 42 when temporarily inserted between the ground and the rear or trailing end of said roof or ceiling-forming rigid panel member 13, in the course of assembling or disassembling said annexe attachment as indicated. When not in use, said prop-pole 42 is conveniently stored away and held by clips 29 attached to eaves plate 41.

Said flexible cover member 15 can be removably connected at its opposite ends to the rear or trailing end of cabin unit 1 by slide-fastener means common to flexible cover strips 43 press-studded to the rear or trailing end of cabin unit 1. Said flexible cover member 15 can also have a flexible weather-resisting skirt 44 to resist entry of adverse weather conditions into the space enclosed by the annexe attachment, at the joint between said flexible cover member 15 and the cover-retaining strip members 28. Similarly, said roof or ceiling-forming rigid panel member 13 can be provided with a flexible weather-resisting cover strip 45 to resist entry of adverse weather conditions into the space enclosed by the annexe attachment, at the hinged connection of the roof or ceiling-forming rigid panel member 13 to the rear or trailing end of cabin unit 1. Said roof or ceiling-forming rigid panel member 13 can be releasably latched to the bottom of the rear or trailing end of cabin unit 1 by hook means 46 fixed to the rear or trailing end of said panel member 13 releasably engaging with pad-locked latching means 47 fitted to beam 23 fixed to the bottom of cabin unit 1.

In use, the annexe attachment of the invention is converted from the collapsed or folded, relatively vertical, non-use position, as shown in FIG. 1 of the drawings, into the assembled or unfolded, relatively horizontal, in-use position, as shown in FIGS. 3 and 4 of the drawings, firstly by unlatching the hinged roof or ceiling-forming rigid panel member 13 at the bottom of the cabin unit 1 and hingedly raising said panel member 13 from the collapsed or folded, relatively vertical, non-use position to the assembled or unfolded, relatively horizontal, in-use position, said panel member being held in the in-use position temporarily by the prop-pole 42 inserted between the ground and the rear of trailing end of said panel member 13. Said floor-supporting legs 20 are then hingedly moved so as to unfold into the in-use position for engagement with the ground, and the hinged floor-forming rigid panel member 11 is then unbolted from engagement with the off-side wall 4 of the cabin unit 1 and hingedly lowered from the collapsed or folded, relatively vertical, non-use position, as shown in FIG. 1 of the drawings, into the assembled or unfolded, relatively horizontal, in-use position, as shown in FIGS. 3 and 4 of the drawings.

Said corner posts 19 are then hingedly unfolded to depend from panel member 13 into the socket member 27 to extend between the roof or ceiling-forming rigid panel member 13 and the floor forming rigid panel member 11 whereby the roof or ceiling-forming rigid panel member 13 is supported by the floor-forming rigid panel member 11. Since the floor-supporting legs 20 are in engagement with the ground, this allows the prop-pole 42 to be removed. The floor-supporting legs 20 and the prop-pole 42 may conveniently have adjustment means to vary their lengths so as to accommodate differences between the ground-level and the floor forming rigid panel member 11 and the roof or ceiling rigid panel member 13, respectively.

Conversion of the annexe attachment of the invention from the assembled or unfolded, relatively horizontal, in-use position into the collapsed or folded, relatively vertical, non-use position is accomplished by a reversal of the above procedure. That is to say, the prop-pole 42 is inserted into position; the corner posts 19 hingedly moved into engagement with clips 37, in the non-use position; the floor-forming rigid panel member 11 hingedly raised into the collapsed or folded, relatively vertical, non-use position and bolted to the rear or trailing end of the cabin unit 1; the floor-supporting legs 20 hingedly folded into the non-use position; the prop-pole 42 removed; and the roof or ceiling-forming rigid panel member 13 hingedly lowered into the collapsed or folded, relatively vertical, non-use position, and latched/pad-locked to the bottom of said cabin unit 1.

What is claimed is:

1. A transportable housing structure capable of forming a caravan/campervan body, said structure comprising a cabin unit having a doorway in a side wall and an access opening at a rear end, with an annexe attachment fitted to said rear end of said cabin unit so as to enclose said access opening, said annexe attachment comprising an assembly of a roof-forming rigid panel member hingedly connected to a top portion of said rear end of said cabin unit so as to be hingedly raised from a collapsed, relatively vertical, non-use position to an assembled, relatively horizontal, in-use position, and hingedly lowered from an assembled, relatively horizontal, in-use position to a collapsed, relatively vertical, non-use position, said roof-forming rigid panel member comprising a frame forming the periphery of said panel member and carrying a roofing; a floor-forming rigid panel member hingedly connected to a bottom portion of said rear end of said cabin unit so as to be hingedly lowered from a collapsed, relatively vertical, non-use position to an assembled, relatively horizontal, in-use position, and hingedly raised from the assembled, relatively horizontal, in-use position to a collapsed, relatively vertical, non-use position; a flexible cover member fitted to extend from a side portion of said rear end of said cabin unit, said flexible cover extending from the top to the bottom of said cabin and extending around the periphery of said roof-forming rigid panel member and the periphery of said floor-forming rigid panel member, so as to form an off-side wall and an end-wall and a near-side wall when said panel members are in the assembled, relatively horizontal, in-use position; roof-supporting posts hingedly connected to the outer corners of the frame of said roof-forming rigid panel member so as to be retained near a roofing space enclosed by said frame when said roof-forming rigid panel member is in the collapsed, relatively vertical, non-use position, said posts being hingedly movable to depend from said frame and be receivable by retaining sockets on an inner face of said floor-forming panel member near outer corners of said panel member when said panel members are in said assembled, relatively horizontal, in-use position, whereby said corner posts maintain a rear end of said roof-forming rigid panel member supported on a rear end of said floor-forming rigid panel member when said panel members are in said assembled, relatively horizontal, in-use position; floor-supporting legs hingedly connected to said floor-forming rigid panel member so as to be hingedly movable from a collapsed, non-use position to an assembled, in-use position for engagement with the ground at the rear extremity when said rigid panel member is in said assembled, relatively horizontal, in-use position; said hinged roof-forming rigid panel member disposed outermost at said rear end of the cabin unit, in relation to said hinged floor-forming rigid panel member, when in said collapsed, relatively vertical, non-use position, whereby said hinged roof-forming rigid panel member covers said hinged floor-forming rigid panel member when in that position; and said hinged roof-forming panel member and a bottom of said cabin unit provided with co-acting fastening means for releasably fastening said hinged roof-forming panel member to said bottom of said cabin unit at said rear end when said hinged roof-forming panel is in said folded, relatively vertical, non-use position.

2. A transportable housing structure as claimed in claim 1 wherein said hinged floor-forming panel member and said side of said cabin unit are provided with co-acting fastending means for releasably fastening said hinged floor-forming panel member to said rear end of said cabin unit at said side when said hinged floor-forming panel member is in said collapsed, relatively vertical, non-use position.

3. A transportable housing structure as claimed in claim 1 wherein said flexible cover member is removably connected by slide-fastener connections attaching opposite ends of said flexible cover member to said rear end of said cabin unit, with top and bottom extremities of said flexible cover member slidably engaging with cover-retaining strip members fixed to an underface of said roof-forming rigid panel member around said periphery and to an outer face of said floor-forming rigid panel member around said periphery.

4. A transportable housing structure as claimed in claim 1 wherein said flexible cover member is comprised of three sections forming said off-side wall and end wall and near-side wall, said cover member further comprising slide-fastener connections for joining said three sections at spaced-apart locations near said roof-supporting corner posts; and slide-fastener connections attaching opposite ends of said cover member to flexible cover strips press-studded to said rear end of said cabin unit.

5. A transportable housing structure as claimed in claim 1 wherein said flexible cover member includes a flexible window section providing a window arrangement including a roll-up blind.

6. A transportable housing structure as claimed in claim 1 wherein said cabin unit is fitted with mechanically/hydraulically operated retractible jacks for raising said cabin unit to an elevated position for dismounting from a vehicle tray and lowering said cabin unit to a lowered position for support at a location site, and raising said cabin from said lowered position to said elevated position for remounting on said vehicle tray.

7. A transportable housing structure as claimed in claim 6 wherein a pair of said jacks is fitted to said near-side and to said off-side of said cabin unit in spaced-apart relationship.

8. An annexe attachment assembly adapted to be fitted to the rear end of a cabin unit having a doorway in a near side wall and an access opening at a rear end, so as to enclose said access opening and form a transportable housing structure capable of forming a caravan/campervan body, said annexe attachment assembly comprising a floor-forming rigid panel member constructed to be hingedly connected to said rear end of said cabin unit at a bottom thereof so as to be hingedly lowered from a collapsed, relatively vertical, non-use position to an assembled, relatively horizontal, in-use position, and hingedly raised from the assembled, relatively horizontal, in-use position to a collapsed, relatively vertical, non-use position; a roof-forming rigid panel member constructed to be hingedly connected to said rear end of said cabin unit at a top thereof so as to be hingedly raised from a collapsed, relatively vertical, non-use position to an assembled relatively horizontal, in-use position, and hingedly lowered from an assembled, relatively horizontal, in-use position to a collapsed, relatively vertical, non-use position, said roof-forming rigid panel member comprising a frame forming a periphery of said panel member and carrying a roofing; a flexible cover member constructed to be fitted to extend from said rear end of said cabin unit at an off-side of said cabin unit, top to bottom, around the periphery of said roof-forming rigid panel member and a periphery of said floor-forming rigid panel member to said near-side of said cabin unit, said flexible cover member extending from the top to the bottom of said cabin so as to form an off-side wall and an end-wall and a near-side wall when said panel members are in an assembled, relatively horizontal, in-use position; roof-supporting posts constructed to be hingedly connected to the outer corners of said frame of said roof-forming rigid panel member so as to be retained near a roofing space enclosed by said frame when said roof-forming rigid panel member is in said collapsed, relatively vertical, non-use position, and hingedly movable to depend from said frame, and be receivable by retaining sockets on an inner face of said floor-forming panel member near outer corners of said panel member when said panel members are in said assembled, relatively horizontal, in-use position, whereby said corner posts maintain a rear end of said roof-forming rigid panel member supported on a rear end of said floor-forming rigid panel member when said panel members are in said assembled, relatively horizontal, in-use position; floor-supporting legs constructed to be hingedly connected to said floor-forming rigid panel member so as to be hingedly movable from a collapsed, non-use position to an assembled, in-use position for engagement with the ground at the rear extremity when said rigid panel member is in said assembled, relatively horizontal, in-use position; said hinged roof-forming rigid panel member constructed to be disposed outermost at said rear end of the cabin unit, in relation to said hinged floor-forming rigid panel member, when in said collapsed, relatively vertical, non-use position, whereby said hinged roof-forming rigid panel member covers said hinged floor-forming rigid panel member when in that position; and said hinged roof-forming panel member being provided with fastening means for releasably fastening said hinged roof-forming panel member to co-acting fastening means on a bottom of said cabin unit at said rear end when said hinged roof-forming panel is in said folded, relatively vertical, non-use position.

9. An annexe attachment assembly as claimed in claim 8 wherein said hinged floor-forming panel member is provided with fastening means for releasably fastening said hinged floor-forming panel member to co-acting fastening means at a side of the rear end of said cabin unit, when said hinged floor-forming panel member is in said collapsed, relatively vertical, non-use position.

10. An annexe attachment assembly as claimed in claim 8 wherein said flexible cover member is removably connected by slide-fastener connections constructed for attaching opposite ends of said flexible cover member to said rear end of said cabin unit, with top and bottom extremities of said flexible cover member slidably engaging with cover-retaining strip members fixed to an underface of said roof-forming rigid panel member around said periphery and to an outerface of said floor-forming rigid panel member around said periphery.

11. An annexe attachment assembly as claimed in claim 8 wherein said flexible cover member is comprised of three sections forming said off-side wall and end wall and near-side wall, said cover member further comprising slide-fastener connections for joining said three sections at spaced-apart locations near said roof-supporting corner posts; and slide-fastener connections attaching opposite ends of said cover member to flexible cover strips constructed to be press-studded to said rear end of said cabin unit.

12. An annexe attachment assembly as claimed in claim 8 wherein said flexible cover member includes a flexible window section providing a window arrangement including a roll-up blind.

* * * * *